United States Patent [19]
Tutupalli et al.

[11] Patent Number: 6,136,054
[45] Date of Patent: Oct. 24, 2000

[54] SYNTHETIC FIREPLACE LOG COMPRISING WAXED CARDBOARD AND METHOD OF PRODUCING

[75] Inventors: Lohit V. Tutupalli, Stockton; Alan Zachary, Oakdale; Charles K. Hall; Roger S. Barron, both of Stockton, all of Calif.

[73] Assignee: Duraflame, Inc., Stockton, Calif.

[21] Appl. No.: 09/122,877

[22] Filed: Jul. 27, 1998

[51] Int. Cl.$^7$ ........................................................ C10L 5/48
[52] U.S. Cl. ................................ 44/535; 44/544; 44/576; 44/596
[58] Field of Search ................................ 44/535, 544, 576, 44/596

[56] References Cited

U.S. PATENT DOCUMENTS

| | | |
|---|---|---|
| 3,297,419 | 1/1967 | Eyre, Jr. . |
| 3,637,355 | 1/1972 | Brockbank . |
| 3,843,336 | 10/1974 | Messman . |
| 3,880,611 | 4/1975 | Weiss . |
| 3,973,922 | 8/1976 | Williams . |
| 3,986,845 | 10/1976 | Hotchkiss . |
| 4,040,796 | 8/1977 | Vincent et al. . |
| 4,042,343 | 8/1977 | Bernard . |
| 4,043,765 | 8/1977 | Tanner . |
| 4,062,655 | 12/1977 | Brockbank . |
| 4,120,666 | 10/1978 | Lange . |
| 4,169,709 | 10/1979 | Stima . |
| 4,302,210 | 11/1981 | Duncan . |
| 4,326,854 | 4/1982 | Tanner . |
| 4,333,738 | 6/1982 | Schrader . |
| 4,539,011 | 9/1985 | Kretzschmann . |
| 4,596,584 | 6/1986 | Darby . |
| 5,393,310 | 2/1995 | Wollen . |
| 5,580,360 | 12/1996 | Pool . |
| 5,868,804 | 2/1999 | Williams et al. . |

*Primary Examiner*—Jerry D. Johnson
*Attorney, Agent, or Firm*—Hogan & Hartson LLP

[57] ABSTRACT

A low cost and an environmentally-friendly synthetic firelog is made by mixing specially processed waxed-cardboard or other wax coated papers of varying proportions with a binder/fuel. The binder/fuel consists of a petroleum wax or a mixture of waxes, the nature and extent of which is suitably modified by in situ admixture with the paraffin wax already present in the waxed-cardboard. Sawdust or other wood fillers may also be added. Upon thorough incorporation of the materials, the resulting mixture is extruded, molded, compressed, or otherwise formed, such that the resulting mass is sufficiently solid to hold its shape at normal room temperature.

29 Claims, No Drawings

SYNTHETIC FIREPLACE LOG COMPRISING WAXED CARDBOARD AND METHOD OF PRODUCING

BACKGROUND OF THE INVENTION

The invention relates to an improved composition for producing synthetic, flammable compositions which are in the shape of fireplace logs which utilize by-products (sawdust and petroleum waxes) along with common waste materials generated in the formation of wax treated food packaging materials, particularly corrugated cardboard cartons. These materials and other such used materials provided for disposal are not readily recyclable. Also disclosed are processes for forming the artificial logs.

DESCRIPTION OF THE INVENTION

Fireplaces have been used in homes over the years for providing heat as well as to provide a desired ambiance. While wood and coal have been the primary fuels for burning in fireplaces, in the recent past there has been an increasing demand for synthetic or artificial fireplace logs. These logs are easier to purchase and store, provide better Btu/lb value than wood or coal, are easier to light, safer to use with virtually no maintenance during burning, and can be used to build fires of a known duration, generally from 2 hours to 4+ hours.

These logs are usually manufactured by combining a carrier material, usually of cellulosic origin, such as sawdust, with a combustible binder/fuel such as a petroleum wax. Over the years there have also been several attempts to use a variety of agricultural and industrial waste products as the carrier material. Thus for example: U.S. Pat. No. 3,297,419 describes the use of rice hulls or shredded paper as partial or total replacements for sawdust. U.S. Pat. Nos. 3,843,336 and 3,880,611 utilized reclaimed pulp and Northern Kraft paper beater stock respectively as sawdust substitutes. U.S. Pat. No. 4,040,796 describes logs composed of ground bark and peanut shells. U.S. Pat. No. 4,043,765 described crushed nut shells, straw, paper pulp, and cotton waste as suitable substitutes for sawdust. U.S. Pat. No. 4,120,666 provided firelog formulations in which sawdust is substituted with shredded newsprint. Some other sawdust substitutes described in various U.S. Patents are sawdust splinters, cotton linter and charcoal powder (U.S. Pat. No. 4,302,210), bagasse, chopped straw, waste paper in pulp, shredded or flaked form, sphagnum moss, nut shells, coffee grounds, fibrous residue left after fruit or vegetable juice extraction, cotton waste, and bark (U.S. Pat. No. 4,326,854), green sawdust, coal liquid, and sorghum (U.S. Pat. No. 4,333,738), and grass clippings and leaves with chipped and ground branches and twigs (U.S. Pat. No. 5,393,310).

The cellulose material is then combined with wax to form a log-like structure.

In U.S. Pat. No. 3,297,419 the synthetic log comprises wax (the flame supporting material) and sawdust (the filler or extender) and a binder/fuel. Paraffin wax is preferred as the flame supporting material and the preferred binder/fuel is microcrystalline wax. Use of slack wax which contains both the paraffin wax and the microcrystalline wax is also disclosed.

U.S. Pat. No. 3,637,355 is primarily directed to pyrogenic coloring matter, primarily chlorinated vinyl polymers applied to a sawdust/wax log. added to color the flame. U.S. Pat. No. 4,062,655 also discloses use of a pyrogenic colorant added to a sawdust /wax log. U.S. Pat. No. 4,169,709 discloses the use of a metallic per chlorate to color the flame.

While each of the prior disclosed compositions can be used to prepare artificial logs which perform substantially as expected, there is a need to produce these products from less expensive materials while at the same time using waste materials which to a great extent end up in land fill because they have very limited recyclability.

SUMMARY OF THE INVENTION

The invention consists of the use of waxed cardboard or paper products with a petroleum wax binder/fuel, possibly blended with sawdust. The waxed cardboard material is of the type used for packaging food stuff, such as fruit and vegetables, the wax being a food grade wax, generally a paraffin wax. Alternative materials include waxed cups, plates, wrapping paper and various other food contacting wax treated paper product s. The material, either alone or blended with sawdust, is heated to 100–190° F. to liquefy the paraffin wax for mixing with the added petroleum wax binder/fuel, or possibly blended at ambient temperature with the added petroleum wax binder/fuel at 205–210° F. In either case, the added petroleum wax binder/fuel is in the range of 10–70% of the total binder/fuel in the product. In other words, the artificial log is formed from cellulose in the form of cardboard with the possible addition of sawdust, and a mixture of paraffin from the card board and additional petroleum wax (binder/fuel). The wax treated cardboard is a significant waste product in land fills as there are no major useful recycle products utilizing the waste cardboard.

It is an object of this invention to produce a synthetic fireplace log utilizing waxed corrugated cardboard, the waxed cardboard being of the type where the cardboard boxes are treated or impregnated with a significant amount of food grade paraffin wax for shipping meats, vegetables, fruits, etc. in refrigerated trucks and cars. The presence of paraffin wax renders them unsuitable for conventional recycling, and often they end up in land fills.

Another object of the invention is to produce synthetic fireplace logs that are environmentally friendly by utilizing waxed corrugated cardboard that currently ends up in land fills because of unsuitability for conventional recycling.

A further object and advantage of the invention is to reduce manufacturing cost by fully utilizing the paraffin wax already present in association with the cardboard, which results in lesser quantities of added binder/fuel materials such as petroleum waxes.

None of the above noted prior patents use waxed corrugated cardboard as the cellulosic filler or extender. Only two of the above cited references use cardboard, one impregnated with flammable materials for use as an igniter strip (U.S. Pat. No. 4,043,765) and the other as a relatively non-flammable paperboard sheath to retain the flammable core material (U.S. Pat. No. 4,539,011).

DESCRIPTION

The above objects are achieved in the preferred embodiment, by specially preparing and processing waxed cardboard along with a binder/fuel and possibly sawdust. In particular, a suitable composition contains 72 parts of corrugated cardboard treated with 10–40% paraffin wax to 28 parts sawdust, and sufficient petroleum wax binder/fuel to bring the total wax content of the composition to about 40% to 65%.

Composition—Cardboard boxes treated with paraffin wax are often used for packing, storing and shipping vegetables, fruits, meats and other foodstuff. in refrigerated trucks and railroad cars. Typical waxed cardboard boxes are treated with more than 10% paraffin wax making those containers unsuitable for conventional recycling. Preferred cartons contain about 30% paraffin wax.

Suitable sources of waxed cardboard include box production quality control rejects, carton fabrication waste and trimmings as well as cardboard boxes discarded after the produce reaches its destination, such as the retailers, supermarkets, warehouses, restaurants, and other large scale users.

Because edible goods are packaged in these cartons, the paraffin wax used to treat the cardboard is generally of food grade, with a melting point of 120° F. or more. For the formation of artificial logs, cardboard material treated with paraffin waxes having a melting point range of 120°–160° F. are considered most suitable, since those paraffin waxes when combined with petroleum waxes, whether single or mixed, produce a blended wax which is not only suitable for binding the cardboard together, but also serves as an additional fuel in the formation of firelogs with desired burning properties.

The fiber portion of the firelogs is primarily the waxed cardboard, mixed with varying proportions of wood fiber. Waxed cardboard material containing 10 to 40% paraffin wax can be used to produce a molded or extrudable mass which, when mixed with sawdust from a variety of species of woods in proportions varying from 1% to 100% of waxed cardboard material to 99% to 0% of wood fiber, possibly with a suitable added binder/fuel; produces a suitable flammable, artificial log. However, a waxed cardboard to wood fiber ratio of 72 to 28 is preferred. Sawdust from a variety of hardwoods (such as Oak) or softwoods (such as pine, incense-cedar, etc.), could be used. However, sawdust containing no more than 50% particles finer than or passing, through U.S. Sieve #70 is preferred.

The preferred binding materials are petroleum waxes that are predominantly microcrystalline in nature having a congealing point ranging from 90° to 180° F. A suitable shapable mass (prepared by extrusion, molding, compression or otherwise formed) can be produced by controlling the amount of total binder/fuel (including the paraffin wax present in the cardboard) from 25% to 75%, while 58% to 65% total binder/fuel is preferred.

Processing conditions—The waxed cardboard is processed into a particulate or granular form so that it can be effectively mixed with varying proportions of wood fiber in the form of sawdust and chips from different species of woods. The blend is then heated, either alone or along with the wood fiber, to a temperature at least 20° F. higher than the melting point of the paraffin wax associated with the cardboard so that the paraffin wax is readily flowable for blending in situ with the binder/fuel wax.

Various different appropriate industrial shredders, choppers, granulators, and other comminuting equipment are commercially available which are capable of suitable size reduction of the waxed cardboard. While shredded material resembling the output from a typical shredder is suitable (about 1/16 inch to 1/2 inch in size), the preferred final product (granulated) passes through a 4–5 mm or 1/4 inch screen resulting in a product having less than 10% particles or fines, which pass through US Sieve #40 (smaller than 425 microns). This can be accomplished in one stage using industrial granulators equipped with appropriate screens to produce the desired size distribution. The total percentage of the smaller particles or "fines" smaller than 425 microns (either alone or in combination with similar particles in the wood fiber) determines the characteristics and composition of the binder/fuel which is added, and the hardness and performance characteristics of the final product.

Alternatively, the waxed cardboard can be processed in a hammer mill. This is also accomplished in two stages, viz., initial shredding using an appropriate industrial shredder, followed by feeding into a conventional hammer mill, preferably simultaneously along with some sawdust to reduce wax buildup on the knives and the screen. The result is a pulverized material that is a little fluffier in character resembling cotton linter in texture.

The waxed cardboard material processed as described above is then heated along with the wood fiber by tumbling in a steam jacketed mixer or a steam jacketed continuous mill. The mixing and blending can be in a batch mode or a continuous operation. Preferably, the waxed cardboard and sawdust mixture is heated to a temperature well above (at least more than 20° F.) the melting point of the paraffin wax in the cardboard before mixing it with additional binder/fuel material. After the waxed cardboard and sawdust mixture has reached the appropriate temperature, the additional binder/fuel is added and the blend is maintained at about 190° F. with mixing.

An alternative procedure is to thoroughly mix the comminuted waxed cardboard and sawdust at ambient temperature and then add hot binder/fuel previously heated to about 205° F. to 210° F. After a period of thorough mixing, the material is allowed to cool to a temperature below 100° F., with the selected temperature being determined by the nature of the components in the resulting mass, and the operating parameters of the subsequent processing technique (extrusion, molding, compression etc.) used to form the synthetic logs.

One approach for adding the binder/fuel is to spray the appropriate hot binder/fuel wax (about 205° to 210° F.) on to the comminuted, granulated, shredded or pulverized waxed cardboard with or without added sawdust using a gear pump and a manifold with spray nozzles and then add the sawdust to the cardboard/wax mix. This results in a better mixture of the fiber and the binder/fuel. Again, this could be accomplished in a batch mixer or a continuous mill. After a period of thorough mixing, the material can be further processed to form firelogs.

The logs can be formed using typical techniques used to form or mold plastics or pulp paper products, such as papier mâché. A preferred process is to extrude the composition into suitable shapes, such as cylindrical or similar shapes, and cut it into desired lengths. A second approach, to make product which has the rough, bark-like outer appearance of a log, possibly with stubs of cut-off branches is to extrude or pour the hot, comminuted cardboard/wax mixture into a mold having the desired shape and texture. A still further approach is to subject a partially solidified but formable mass to compression. Alternatively, the forming techniques could be combined (i.e., extrude a cylinder and subject the cut, cylindrical shape to compression molding). One skilled in the art will recognize that numerous different techniques can be used to form the hot or cold (ambient temperature) mixture into any desired shape. Also the logs can be formed in either a batch or a continuous process.

Table 1 below lists various different combinations of materials and operating conditions which have been found to be suitable for producing synthetic logs with various different performance characteristics. Referring to the table below, waxed cardboard (WCB) was comminuted to the form listed as WCB Form, and the combination of WCB and sawdust (SD) was either pre-heated and blended with hot wax binder/fuel (WB), or the WCB and SD at ambient temperature was blended with hot wax binder/fuel. The temperature and time are set forth under Blend. An indication of whether the processing is batch or continuous is set forth under process. Any additional processing or materials added following immediately after the Blend step are listed as Additional Steps. The composition of the final product and comments regarding the nature, appearance or performance of the artificial log formed is listed under Comments.

For example, in Experiment 1, which is a batch process, 72 parts of a waxed cardboard containing 28% wax was granulated, blended with 28 parts of sawdust, pre-heated to 135° F. and mixed with 55% of a petroleum binder/fuel wax at 190° F. (the WCB and SD together constituting 45%) for 3–10 minutes to achieve thorough mixing. The mix was then allowed to cool to about 85° F. and extruded into appropriate shape. The final product would weigh about 5-lb., and consisted of 64% wax and 36% fibrous material (wax free cardboard and sawdust) where approximately 67% of the fiber was from the cardboard and 33% was from the sawdust. The resultant product, upon combustion in a fireplace gave a suitable flame which lasted for about 3 hours. The other experiments disclose various different compositions and processing conditions to produce various different end products.

the meaning and range of the equivalence of the claims are to be embraced within their scope.

What is claimed is:

1. A method of making artificial logs comprising the steps of:
   a) converting paraffin wax treated paper products to produce particles with a largest dimension of less than about ½ inch,
   b) heating said particles to a temperature at least about 20° F. greater then the melting temperature of the paraffin wax on the paper product,
   c) thoroughly mixing said heated material from step b) with a binder/fuel at about 190° F. to form a paper product/paraffin wax/binder/fuel mixture,
   d) cooling the mixture from step c) to below 100° F., and
   e) forming said mixture into solid shapes having diameters and lengths suitable for use as artificial logs.

2. The method of claim 1 wherein the paper product is corrugated cardboard treated with paraffin wax.

3. The method of claim 2 wherein the said particles of paraffin wax coated corrugated cardboard are heated to a temperature of from about 120° F. to about 190° F.

4. The method of claim 2 wherein the corrugated cardboard treated with paraffin wax is converted by shredding, chopping, comminuting, granulation, hammer milling or a combination thereof.

TABLE 1

REPRESENTATIVE OPERATING CONDITIONS

| Experiment | 1 | 2 | 3 | 4 | 5 | 6 | 7 | 8 |
| --- | --- | --- | --- | --- | --- | --- | --- | --- |
| WCB + SD | 45% | 100% | 53% | 49% | 41% | 45% | 45% | 60% |
| WCB, parts | 72 | 100 | 72 | 72 | 20 | 58 | 80 | 50 |
| % Cardboard | 72 | 72 | 72 | 72 | 88 | 72 | 71 | 71 |
| % Wax | 28 | 28 | 28 | 28 | 12 | 28 | 29 | 29 |
| WCB Form | granulated | pulverized | granulated | granulated | granulated | granulated | granulated | shredded |
| Sawdust (SD) parts | 28 | 10 | 28 | 28 | 80 | 42 | 20 | 50 |
| Wax binder/fuel | 55% | 1 | 47% | 51% | 59% | 55% | 55% | 40% |
| Wax binder/fuel temp. | 190° F. | 0 | 190° F. | 210° F. | 190° F. | 210° F. | 190° F. | 190° F. |
| WCB/SD temp. | 135° F. | 135° F. | 135° F. | ambient | 135° F. | ambient | 135° F. | 135° F. |
| Blend Heat ° F. | 180° F. | — | 180° F. | 180° F. | 180° F. | 180° F. | 180° F. | 180° F. |
| Time, min | 3–10 | — | continuous | 3–10 | continuous | 3–10 | 3–10 | continuous |
| Process | batch | batch | continuous | batch | continuous | batch | batch | continuous |
| Additional Steps | extrusion | compress | extrusion | extrusion | extrusion | extrusion | extrusion | extrusion |
| Final Prod. Weight | 5 lb | 5 lb | 6 lb | 5 lb | 3 lb | 5 lb | 5 lb | 3 lb |
| Final Prod., % CB Fiber | 24 | 72 | 27 | 25 | 8 | 19 | 27 | 25 |
| % Sawdust | 12 | 0 | 15 | 14 | 32 | 19 | 7 | 25 |
| %Wax | 64 | 28 | 58 | 61 | 60 | 62 | 66 | 50 |
| Comments | burns for 3 hrs. | bruns for 3 hrs | burns up to 4 hrs | burns for 3 hrs | burns for 2 hrs | burns for 3 hrs | burns for 3 hrs | burns for 2 hrs |

The foregoing is meant to illustrate, but not to limit, the scope of the invention. Those of ordinary skill in the art can readily envision and produce further embodiments, based on the teachings herein, without undue experimentation.

The present invention may be embodied in other specific forms without departing from its essential characteristics. The described embodiment is to be considered in all respects only as illustrative and not as restrictive. For example, one skilled in the art will recognize that various additives can be blended with the mix to create logs of different appearances, other fibrous materials can be used in place of the sawdust and binder/fuel materials may be used with or in place of the petroleum wax binder/fuel. Therefore, the scope of the invention is indicated by the appended claims rather than by the foregoing description. All changes which come within 5. The method of claim 2 further including the addition of fibrous material.

6. The method of claim 5 wherein the fibrous material is wood fibers, wood chips and/or sawdust.

7. The method of claim 6 wherein the corrugated cardboard treated with paraffin wax is converted into a pulverized material by processing in a hammer mill before heating.

8. The method of claim 7 wherein the fibrous material is added to the paraffin wax treated corrugated cardboard before processing in the hammer mill.

9. The method of claim 5 wherein the fibrous material and the binder/fuel are added to the corrugated cardboard treated with paraffin wax separately or in combination at any time prior to the hot mixture of cardboard and fibrous material being formed into cylindrical or other similar shape.

10. The method of claim 1 wherein the binder/fuel material is petroleum wax.

11. The method of claim 1 wherein the forming of said mixture into said solid shapes is performed using extrusion or molding or a combination of extrusion and molding.

12. A method of making artificial logs comprising the steps of:
   a) converting paraffin wax treated corrugated cardboard to produce particles with a largest dimension of less than about one half inch,
   b) heating a binder/fuel to about 205° F. to about 210° F.,
   c) thoroughly mixing said heated material from step b) with the particles produced in step a) to form a cardboard/paraffin wax/binder/fuel mixture,
   d) cooling the mixture from step c) to below 100° F., and
   e) forming said mixture into solid shapes having diameters and lengths suitable for use as artificial logs.

13. The method of claim 12 wherein the binder/fuel heated in step b) is sprayed on to the paraffin wax treated corrugated cardboard particles formed in step a) prior to mixing in step c).

14. The method of claim 12 wherein the binder/fuel is petroleum wax.

15. An artificial log comprising particles of a paraffin wax treated cardboard blended with a binder/fuel and a fibrous/fuel filler, wherein the ratio of paraffin wax treated cardboard to fibrous/fuel filler is about 72/28.

16. The artificial log of claim 15 wherein said binder/fuel is petroleum wax.

17. The artificial log of claim 15 wherein the fibrous/fuel filler is wood fiber and/or sawdust.

18. The artificial log of claim 15 wherein the paraffin wax and binder/fuel constitute from about $25\%_w$ to about $70\%_w$ of the artificial log.

19. The artificial log of claim 18 wherein the paraffin wax and binder/fuel constitute from about $58\%_w$ to about $65\%_w$ of the artificial log.

20. The artificial log of claim 15 wherein the largest dimension of the particles of paraffin wax treated cardboard is less than about ½-inch.

21. The artificial log of claim 20 wherein the largest dimension of the particles of paraffin wax treated cardboard is no greater than about ¼-inch.

22. An artificial log comprising particles of a paraffin wax treated cardboard blended with a binder/fuel and a fibrous/fuel filler wherein the paraffin wax treated cardboard contains from about $10\%_w$ to about $40\%_w$ paraffin wax.

23. The artificial log of claim 22 wherein binder/fuel is petroleum wax.

24. The artificial log of claim 22 wherein the fibrous/fuel filler is wood fiber and/or sawdust.

25. The artificial log of claim 22 wherein the paraffin wax and the binder/fuel constitute from about $25\%_w$ to about $70\%_w$ of the artificial log.

26. The artificial log of claim 25 wherein the paraffin wax and binder/fuel constitute from about $58\%_w$ to about $65\%_w$ of the artificial log.

27. The artificial log of claim 22 wherein the ratio of wax treated cardboard to fibrous/fuel filler is about 72/28.

28. The artificial log of claim 22 wherein the largest dimension of the particles of paraffin wax treated cardboard is less than about ½-inch.

29. The artificial log of claim 28 wherein the largest dimension of the particles of paraffin wax treated cardboard is no greater than about ¼-inch.

\* \* \* \* \*